Figure 1:
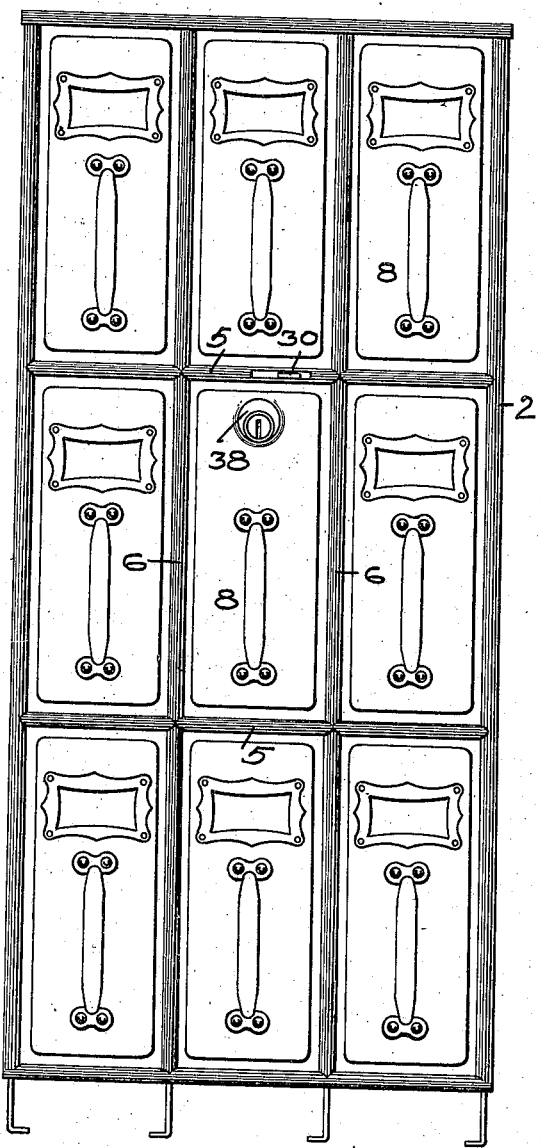

No. 885,790. PATENTED APR. 28, 1908.
J. D. RIPSON & E. G. SAMPSON.
LOCKING DEVICE.
APPLICATION FILED OCT. 26, 1907.

2 SHEETS—SHEET 1.

WITNESSES.

INVENTORS.

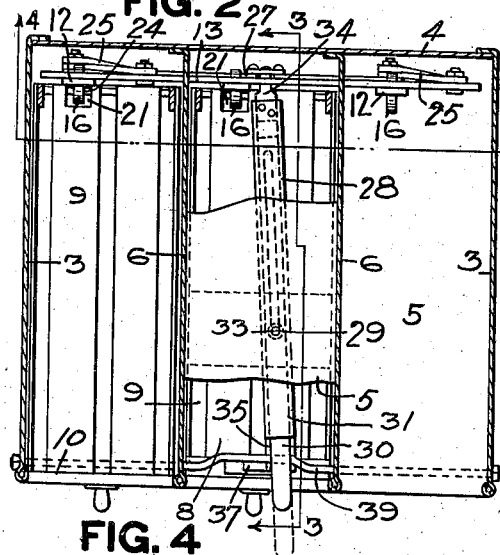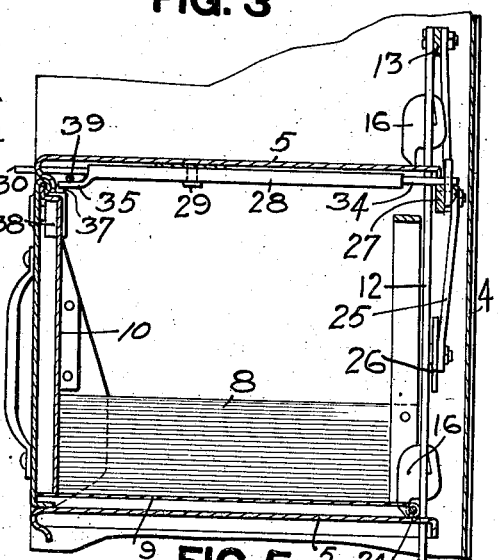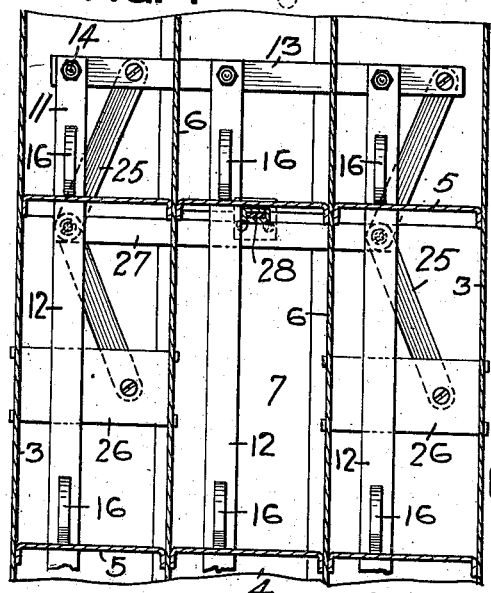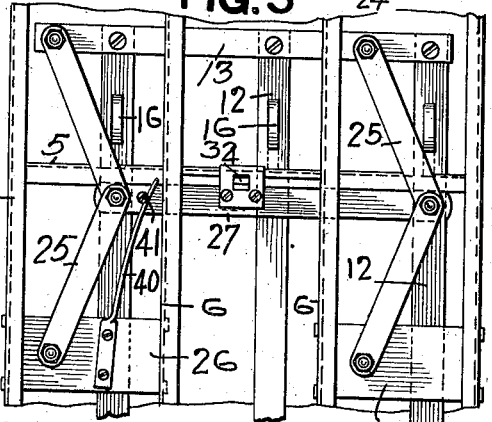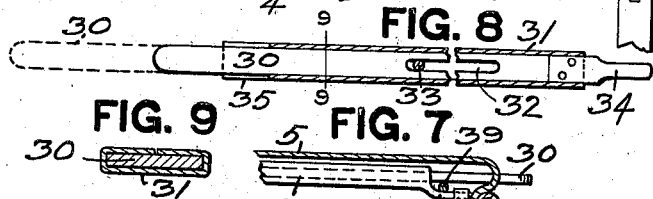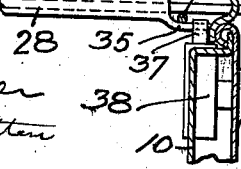

UNITED STATES PATENT OFFICE.

JOHN D. RIPSON, OF ROCHESTER, AND ERICK G. SAMPSON, OF JAMESTOWN, NEW YORK, ASSIGNORS TO ART METAL CONSTRUCTION COMPANY, OF JAMESTOWN, NEW YORK, A CORPORATION OF NEW YORK.

LOCKING DEVICE.

No. 885,790.   Specification of Letters Patent.   Patented April 28, 1908.

Application filed October 26, 1907. Serial No. 399,289.

*To all whom it may concern:*

Be it known that we, JOHN D. RIPSON, a resident of Rochester, in the county of Monroe and State of New York, and ERICK G. SAMPSON, a resident of Jamestown, county of Chautauqua, and State of New York, have invented a new and useful Improvement in Locking Devices; and we do hereby declare the following to be a full, clear, and exact description thereof.

Our invention relates to filing cases and has reference more particularly to mechanism for locking the filing drawers or bases so that they cannot be opened by an unauthorized person, such as set forth and broadly claimed in an application filed by us August 29th, 1907, Serial No. 390,572.

The present invention relates to certain modifications in the manner of locking and releasing the locking device and comprises the novel features hereinafter set forth and claimed.

In the accompanying drawing Figure 1 is a front view of a filing case embodying our invention; Fig. 2 is a horizontal section through a portion of said cabinet; Fig. 3 is a section on the line 3—3, Fig. 2; Fig. 4 is a section taken on the line 4—4, Fig. 2; Fig. 5 is a rear view of a portion of the filing case; Fig. 6 is an enlarged detail of the locking dog in locking position; Fig. 7 is an enlarged detail of the manner of locking the operating lever; Fig. 8 is a detail of the operating lever; Fig. 9 is a cross section on the line 9—9 Fig. 8; and Fig. 10 is a view of a portion of one of the locking strips.

The cabinet 2 may be formed of sheet metal of suitable thickness, and said cabinet is provided with the side walls 3 and rear walls 4. The horizontal partitions 5 and vertical partitions 6 act to divide the cabinet into a series of pockets or pigeon holes 7 for the reception of the filing bases 8 which may either be in the form of a drawer or a modified base having a bottom 9 and front 10 provided with suitable means for holding the documents to be filed (not shown).

The locking mechanism shown comprises the frame 11 which is made up of the vertical locking strips 12 and the cross strips 13 secured together by means of the bolts 14. The locking strips 12 are formed with slots 15 which are adapted to receive the locking dogs 16. These locking dogs 16 have the recesses 17 and 18, the recess 18 being made sufficiently large to permit the dog to be inserted in said slots 15 so as to bring the recess 17 into engagement with the said locking strip and when in this position the lug 19 of said locking dog is bent over into the position shown in Fig. 6 so as to secure said locking dog in position and yet permit of its movement up and down within the slot 15. The dotted line in Fig. 6 indicates the position of the lug 19 before it is bent over to secure the dog in place upon the locking strip. The dog 16 is further provided with the latch 20 which is adapted to enter the opening 21 formed in the bottom of the filing base as well as the opening 22 formed in the horizontal partition 5. The outer face of the latch 20 is beveled, as at 23, for the purpose fully hereinafter set forth. When said locking dogs 16 are in their lowered position the latch 20 engages the strengthening rod 24 of the filing base so as to prevent the said base from being withdrawn unless the dog 16 is raised.

In order to provide for the lifting of the locking strips, together with the locking dogs carried thereby, we provide the toggle mechanism 25 connected at one end to the stationary plates 26 and at the opposite end to the cross bar 13. The toggle mechanism is connected to the horizontally movable strap or link 27 which is operated by means of the lever 28. This lever 28 is pivoted at 29 to one of the horizontal partitions 5 and has its outer end projecting out through the casing at the front thereof. This lever 28 is preferably made telescoping so that it can be drawn out to get a long leverage and when not in use can be pushed inwardly so as not to project out far beyond the casing. As shown the lever comprises the outer operating bar 30 and the inner substantially tubular section 31 into which said bar slides. A slot 32 is provided in the bar 30 through which the pin 33 projects in order to hold said bar from accidental displacement. The tubular portion 31 is provided at its inner end with a connection 34 connected to the link 27 connecting the toggles. The outer end of the tubular section 31 of the lever is provided with a tongue 35 adapted to be engaged by the latch 37 of any suitable lock 38 mounted on the front of one of the filing bases to prevent the lever moving in that direction while it is prevented from moving in opposite direction by the casing. In this manner the lever may be locked against movement and when so locked all the filing bases are likewise locked so that they cannot be withdrawn. A rod 39 acts as a guide for the tongue 35 of the lever.

A spring 40 secured to the plate 26 bears against the stop 41 on the strap 27 and acts to aid in the movement of the toggle.

When our invention is in use and the operating lever is locked in position by the lock 38 none of the filing bases can be withdrawn. If, however, it is desired to withdraw any of the filing bases the lock 38 is released from the lever and the operating bar may then be withdrawn and by swinging said bar in the proper direction the toggle mechanism will be operated to raise the locking strips 12 and with them the dogs 16. In this manner all of the filing bases are released and any one may be removed.

As the dogs 16 are permitted a certain amount of movement independent of the vertical movement of the locking strips due to said dogs engaging the slots 15, any one of the filing bases may be inserted when the others are locked by simply pushing the filing base into place, whereupon the inner end of said filing base will come in contact with the bevel face of the latch 20 and the locking dog will be lifted until the rod 24 has passed said latch, whereupon said locking dog will fall and the latch drop into the openings 21 and 22. This dropping of the dog into position prevents the withdrawal of the filing base until the operating lever is operated to lift the locking strips.

What we claim is:

1. In a filing cabinet, the combination of a casing, filing bases movably mounted therein, vertically movable frame, locking devices carried by said frame to engage said bases, toggle mechanism connected to said frame, a lever, connections between said lever and said toggle mechanism, and means for locking said lever.

2. In a filing cabinet, the combination of a casing, filing bases movably mounted therein, a vertically movable frame comprising vertical strips and cross strips connected thereto, locking devices carried by said vertical strips, toggle mechanism connected to said frame, a lever, connections between said lever and said toggle mechanism and means for locking said lever.

3. In a filing cabinet, the combination of a casing, filing bases movably mounted therein, a vertically movable frame comprising vertical strips and cross strips connected thereto, locking devices carried by said frame engaging said bases, toggle mechanism connected to said frame, a strap connecting said toggle mechanism, a lever connected to said strap, and means for locking said lever.

4. In a filing cabinet, the combination of a casing, filing bases mounted therein, a vertically movable strip having slots therein, locking devices adapted to engage said slots and having recesses therein to engage said strip, said locking devices adapted to engage said bases, a lever, connections between said lever and said movable strip, and means for locking said lever.

5. In a filing cabinet, the combination of a casing, filing bases movably mounted therein, a vertically movable strip having slots therein, toggle mechanism, locking devices in said slots and having recesses adapted to engage said strip, projections on said locking devices adapted to enter openings in said bases, a lever, connections between said lever and said toggle mechanism, and means for locking said lever.

In testimony whereof, we the said JOHN D. RIPSON and ERICK G. SAMPSON have hereunto set our hands.

JOHN D. RIPSON.
ERICK G. SAMPSON.

Witnesses as to Ripson:
MORITZ SCHOENEBERG,
HOMER VAN BUSKIRK.

Witnesses as to Sampson:
CHAS. B. LEACH,
C. W. STRONG.